(12) United States Patent
Moisio et al.

(10) Patent No.: US 11,405,804 B2
(45) Date of Patent: Aug. 2, 2022

(54) REDUCING COVERAGE PROBLEMS VIA DYNAMIC MEASUREMENTS

(71) Applicant: Nokia Technologies Oy, Espoo (FI)

(72) Inventors: Martti Moisio, Klaukkala (FI); Zexian Li, Espoo (FI); Mikko Uusitalo, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 345 days.

(21) Appl. No.: 16/643,579

(22) PCT Filed: Sep. 1, 2017

(86) PCT No.: PCT/FI2017/050614
§ 371 (c)(1),
(2) Date: Mar. 1, 2020

(87) PCT Pub. No.: WO2019/043286
PCT Pub. Date: Mar. 7, 2019

(65) Prior Publication Data
US 2020/0275291 A1    Aug. 27, 2020

(51) Int. Cl.
*H04W 24/04* (2009.01)
*G01C 21/00* (2006.01)
(Continued)

(52) U.S. Cl.
CPC .......... *H04W 24/04* (2013.01); *G01C 21/005* (2013.01); *H04W 24/08* (2013.01); *H04W 40/22* (2013.01); *H04W 72/04* (2013.01)

(58) Field of Classification Search
None
See application file for complete search history.

(56) References Cited

U.S. PATENT DOCUMENTS

| 9,668,146 B2 | 5/2017 | Lau |
| 2011/0130135 A1* | 6/2011 | Trigui .................. H04W 24/08 455/423 |

(Continued)

FOREIGN PATENT DOCUMENTS

| WO | 2016/150494 A1 | 9/2016 |
| WO | 2017/100473 A1 | 6/2017 |

OTHER PUBLICATIONS

"3rd Generation Partnership Project; Technical Specification Group Radio Access Network; Study on Scenarios and Requirements for Next Generation Access Technologies; (Release 14)", 3GPP TR 38.913, V14.1.0, Dec. 2016, pp. 1-38.
(Continued)

*Primary Examiner* — Brian S Roberts
(74) *Attorney, Agent, or Firm* — Nokia Technologies Oy

(57) ABSTRACT

There is provided a method in a radio communication network providing a service for a plurality of devices, the method comprising: determining a service outage probability for a device that is going to move to a sub-area of a coverage area of the network, the service outage probability associated with said sub-area; in response to determining that the service outage probability exceeds a threshold, requesting a measurement device to move to said sub-area and to perform one or more radio frequency measurements; determining whether the service outage probability exceeds another threshold based at least on the requested one or more radio frequency measurements; and triggering at least one action if the service outage probability exceeds said another threshold.

21 Claims, 9 Drawing Sheets

210 DETERMINING A SERVICE OUTAGE PROBABILITY FOR A TERMINAL DEVICE THAT IS GOING TO MOVE TO A SUB-AREA OF A COVERAGE AREA OF A NETWORK, THE SERVICE OUTAGE PROBABILITY ASSOCIATED WITH SAID SUB-AREA

↓

220 IN RESPONSE TO DETERMINING THAT THE OUTAGE PROBABILITY EXCEEDS A THRESHOLD, REQUESTING A MEASUREMENT DEVICE TO MOVE TO SAID SUB-AREA AND TO PERFORM ONE OR MORE MEASUREMENTS

↓

230 DETERMINING WHETHER THE OUTAGE PROBABILITY EXCEEDS ANOTHER THRESHOLD BASED AT LEAST ON THE REQUESTED ONE OR MORE MEASUREMENTS

↓

240 TRIGGERING AT LEAST ONE ACTION IF THE OUTAGE PROBABILITY EXCEEDS SAID ANOTHER THRESHOLD

(51) Int. Cl.
*H04W 24/08* (2009.01)
*H04W 40/22* (2009.01)
*H04W 72/04* (2009.01)

(56) References Cited

U.S. PATENT DOCUMENTS

| | | | |
|---|---|---|---|
| 2016/0252350 A1* | 9/2016 | Wharton | G01S 19/39 |
| | | | 701/25 |
| 2017/0006417 A1 | 1/2017 | Canoy et al. | |
| 2017/0013476 A1 | 1/2017 | Suthar et al. | |
| 2017/0013478 A1* | 1/2017 | Singh | H04W 4/40 |
| 2017/0132934 A1 | 5/2017 | Kentley et al. | |
| 2017/0215121 A1* | 7/2017 | Condeixa | H04L 67/10 |
| 2017/0248963 A1 | 8/2017 | Levinson et al. | |
| 2017/0248969 A1 | 8/2017 | Ham et al. | |

OTHER PUBLICATIONS

"New SID on Enhanced Support for Aerial Vehicles", 3GPP TSG-RAN Meeting #75, RP-170779, Agenda: 10.1.2, NTT Docomo Inc, Mar. 6-9, 2017, 4 pages.

"LTE Unmanned Aircraft Systems", Trial Report, Qualcomm Technologies, Inc, v1.0.1, May 12, 2017, pp. 1-65.

Moussa et al., "Aerial Mast vs Aerial Bridge Autonomous UAV Relay: A Simulation-Based Comparison", 6th International Conference on New Technologies, Mobility and Security (NTMS), Mar. 30-Apr. 2, 2014, 5 pages.

"Moving Networks: UAVs for B5G", Monet, 2017, 90 pages.

Sboui et al., "Achievable Rates of UAV-Relayed Cooperative Cognitive Radio MIMO Systems", IEEE Access, vol. 5, Apr. 19, 2017, pp. 5190-5204.

"Emergency Flexible Aerial Relay Nodes for Communication Recovery and D2D Relaying", YouTube, Retrieved on Mar. 4, 2020, Webpage available at : https://www.youtube.com/watch?v=dwz7Y7l8Cbw.

Mekikis et al., "Flexible Aerial Relay Nodes for Communication Recovery and D2D Relaying", IEEE 5th Global Conference on Consumer Electronics, Oct. 11-14, 2016, 2 pages.

Zhan et al., "Wireless Relay Communications with Unmanned Aerial Vehicles: Performance and Optimization", IEEE Transactions on Aerospace and Electronic Systems, vol. 47, No. 3, Jul. 2011, pp. 2068-2085.

International Search Report and Written Opinion received for corresponding Patent Cooperation Treaty Application No. PCT/FI2017/050614, dated Dec. 18, 2017, 19 pages.

"3rd Generation Partnership Project; Technical Specification Group Services and System Aspects; Feasibility Study on New Services and Markets Technology Enablers; Stage 1 (Release 14)", 3GPP TR 22.891, V14.2.0 , Sep. 2016, pp. 1-95.

Zeng et al., "Wireless Communications with Unmanned Aerial Vehicles: Opportunities and Challenges", IEEE Communications Magazine, Vil 54, No. 5, May 2016, pp. 36-42.

"5G Automotive Vision", The 5G Infrastructure Public Private Partnership (5G PPP), Oct. 20, 2015, pp. 1-67.

Extended European Search Report received for corresponding European Patent Application No. 17923691.4, dated Mar. 19, 2021, 11 pages.

\* cited by examiner

REDUCING COVERAGE PROBLEMS VIA DYNAMIC MEASUREMENTS

RELATED APPLICATION

This application was originally filed as PCT Application No. PCT/FI2017/050614 filed Sep. 1, 2017.

TECHNICAL FIELD

The invention relates to communications. More particularly, the present invention relates to communications of vehicles.

BACKGROUND

Human assisted or unassisted vehicles are expected to become more and more popular in the future. Such vehicles, such as industrially used cargo carriers, forklifts, cargo robots and the like, may be communicatively coupled with network infrastructure that may be configured to control said vehicles within certain area or areas such as a factory site, a warehouse, a plant, container area or a harbor area. Unfortunately, there may be shadow regions (sometimes referred to as dead regions) within said area or areas. Within such shadow regions, caused by, for example, interference and/or blocking elements, communication between the vehicle and the network infrastructure may be compromised or impossible. In many industrial scenarios, there can be large moving objects causing fast changes in the propagation environment which are difficult to tackle with traditional static network planning. This is especially true on higher frequency bands which are planned to be taken into use for, for example, 5G communications. On those higher frequency bands for example the effect of LOS (Line-Of-Sight) blockage by is much more serious. As an example, large metallic straddle carriers on a harbor area may cause themselves LOS blockage but also the amount and position of sea containers on the field constantly change, causing the propagation environment to be very dynamic. Problem may be even more serious for services which require extremely high reliability and low latency, for example Ultra-Reliable Low Latency Communications (URLLC) as specified in 3GPP. Such services may be even more sensitive to worsening channel conditions caused by the dynamic propagation conditions. Hence, there may be a need to provide solutions which may enhance the operation of said vehicles within said area or areas.

BRIEF DESCRIPTION

According to an aspect, there is provided the subject matter of the independent claims. Some embodiments are defined in the dependent claims.

One or more examples of implementations are set forth in more detail in the accompanying drawings and the description below. Other features will be apparent from the description and drawings, and from the claims.

BRIEF DESCRIPTION OF DRAWINGS

In the following some embodiments will be described with reference to the attached drawings, in which.

DETAILED DESCRIPTION OF SOME EMBODIMENTS

Figure 1A:
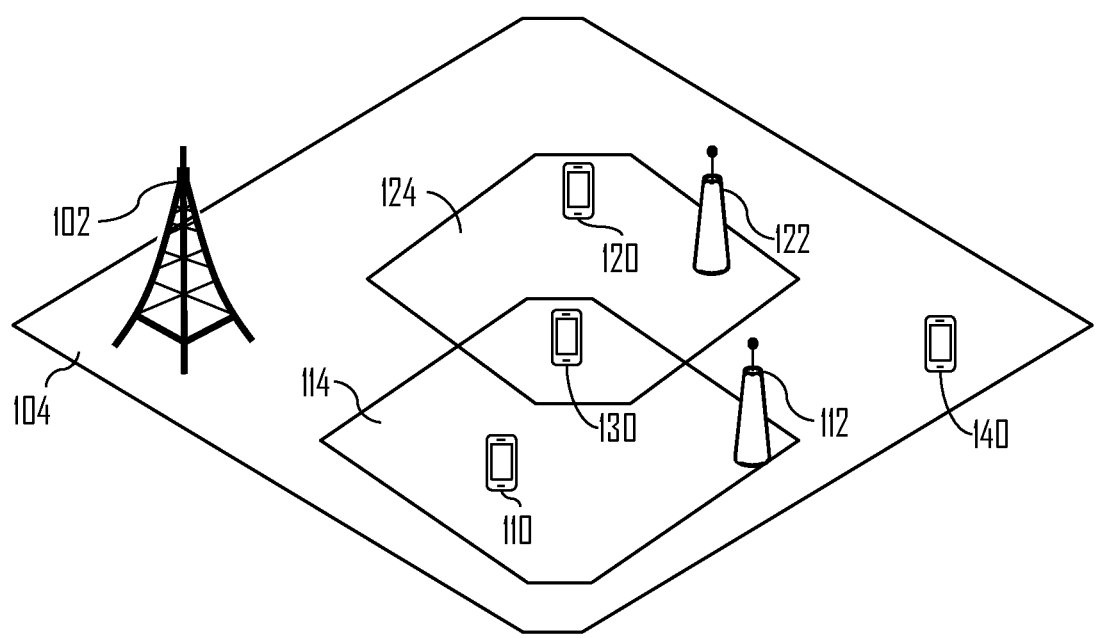
FIGS. 1A and 1B illustrate a cellular communication systems to which embodiments of the invention may be applied.

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Embodiments described may be implemented in a radio system, such as in at least one of the following: Worldwide Interoperability for Micro-wave Access (WiMAX), Wireless Local Area Network (WLAN), like IEEE 802.11 based radio), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), Long Term Evolution (LTE), and/or LTE-Advanced., and New Radio (NR) standard being developed in 3GPP.

The embodiments are not, however, restricted to the system given as an example but a person skilled in the art may apply the solution to other communication systems provided with necessary properties. One example of a suitable communications system is the 5G concept, or as expressed in 3GPP, the NR concept. 5G is likely to use multiple input—multiple output (MIMO) techniques (including MIMO antennas), many more base stations or nodes than the LTE (a so-called small cell concept), including macro sites operating in co-operation with smaller stations and perhaps also employing a variety of radio technologies for better coverage and enhanced data rates. 5G will likely be comprised of more than one radio access technology (RAT), each optimized for certain use cases and/or spectrum. 5G mobile communications will have a wider range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility. It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or cloud data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent. Some other technology advancements probably to be used are Software-Defined Networking (SDN), Big Data, and all-IP, which may change the way networks are being constructed and managed.

Figure 1B:
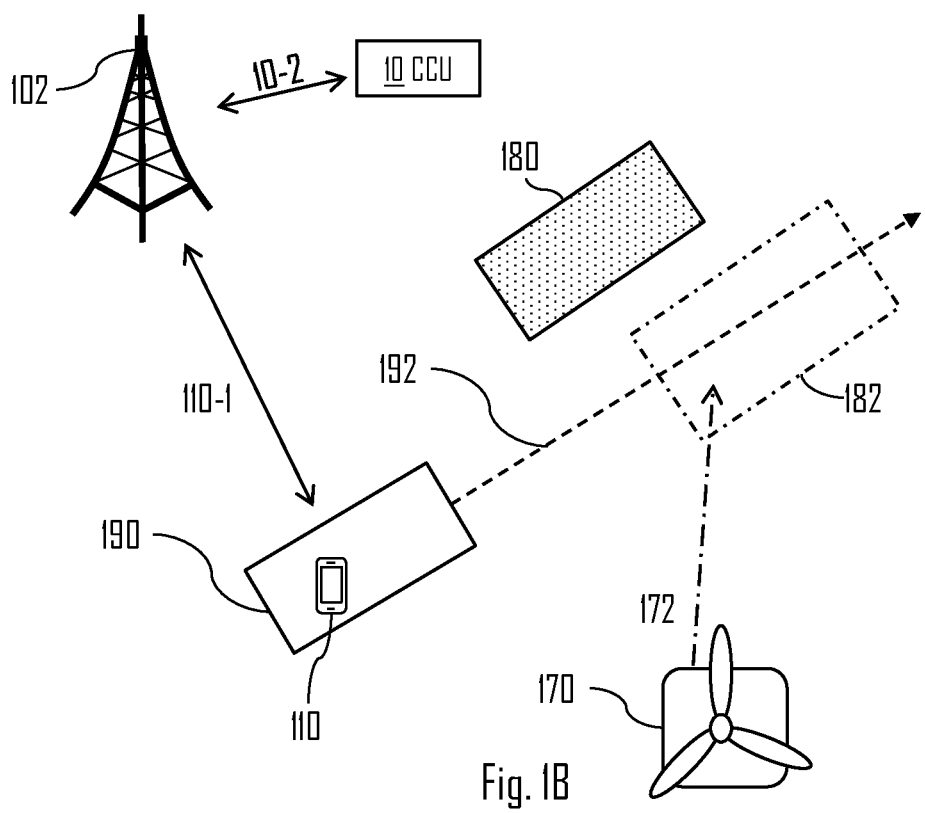

FIGS. 1A and 1B illustrate some examples of wireless systems to which embodiments may be applied. Referring to FIG. 1A, wireless communication networks, such as the Long Term Evolution (LTE), the LTE-Advanced (LTE-A) of the 3rd Generation Partnership Project (3GPP), WLAN, or the 5G, are typically composed of at least one network element, such as a network element 102, providing at least one cell, such as cell 104. In the example of FIG. 1A, cells 104, 114, 124 are shown. The cell 114 may be provided by a network element 112, and the cell 124 may be provided by a network element 122, for example. The cell 104 may be provided by the network element 102. It is, however, possible that a network element of the radio system may provide more than one cell. Thus, for example, the network element 102 may provide the cell 104, the cell 114, and/or the cell 124. In general, the system may comprise one or more network elements, wherein each network element provides one or more cells providing service to one or more terminal devices in the cells. The cells 104, 114, 124 may be used to provide service to one or more terminal devices 110, 120, 130, 140 in the coverage area of the cells. The coverage area may refer to area in which the communication network is able to provide the needed service to the terminal devices.

Each cell of the radio communication network may be, e.g., a macro cell, a micro cell, a femto, or a pico-cell, for example, meaning that there may be one or more of each of the described cells. Each network element of the radio communication network, such as the network elements 102, 112, 122, may be an evolved Node B (eNB) as in the LTE and LTE-A, a radio network controller (RNC) as in the UMTS, a base station controller (BSC) as in the GSM/GERAN, or any other apparatus capable of controlling wireless communication and managing radio resources within a cell or cells. That is, there may be one or more of each of the described apparatuses or entities. For 5G solutions, the implementation may be similar to LTE-A, as described above. The network elements 102, 112, 122 may be base station(s) or a small base station(s), for example. In the case of multiple eNBs in the communication network, the eNBs may be connected to each other with an X2 interface as specified in the LTE. Other communication methods between the network elements may also be possible, e.g. in case of some other type of communication method such as 5G.

The wireless system may further comprise at least one terminal device 110, 120, 130, 140 to which the one or more network elements 102, 112, 122 may provide communication services. The cells 104, 114, 124 may provide service for the at least one terminal device 110, 120, 130, 140, wherein the at least one terminal device 110, 120, 130, 140 may be located within or comprised in at least one of the cells 104, 114, 124. The at least one terminal device 110, 120, 130, 140 may communicate with the network elements 102, 112, 122 using communication link(s), which may be understood as communication link(s) for end-to-end communication, wherein source device transmits data to the destination device. It needs to be understood that the cells 104, 114, 124 may provide service for a certain area, and thus the at least one terminal device 110, 120, 130, 140 may need to be within said area in order to be able to use said service (horizontally and/or vertically). For example, a third terminal device 130 may be able to use service provided by the cells 104, 114, 124. On the other hand, a fourth terminal device 140 may be able to use only service of the cell 104, for example. The cells 104, 114, 124 may be at least partially overlapping with each other. Thus, the at least one terminal device 110, 120, 130, 140 may be enable to use service of more than one cell at a time. For example, the sub-cells 114, 124 may be small cells that are associated with the macro cell 104. This may mean that the network element 102 (e.g. macro network element 102) may at least partially control the network elements 112, 122 (e.g. local area access nodes). For example, the macro network element 102 may cause the local area access nodes 112, 122 to transmit data to the at least one terminal device 110, 120, 130, 140. It may also be possible to receive data, by the network element 102, from the at least one terminal device 110, 120, 130, 140 via the network elements 112, 122. The at least one terminal device 110, 120, 130, 140 may comprise mobile phones, smart phones, tablet computers, laptops and other devices used for communication with the wireless communication network.

In general, systems like the one presented in FIG. 1A, may be used to provide cellular service to one or more terminal devices associated with vehicles. For example, such terminal device may be comprised in a vehicle or be communicatively coupled with vehicle system using, for example, wireless local area network (WLAN) or similar short range connection (e.g. Bluetooth). The terminal device (e.g. 110) may thus be used to at least partially control the vehicle associated with said terminal device. One example of communication methods which may be used to provide such service to the vehicles, may be subject to lower latency requirements and higher reliability requirements than regular cellular communication methods (e.g. compared with voice data). One example may be Ultra-Reliable Low Latency Communications (URLLC). In URLLC service, data packets may need to be delivered within certain latency requirement (e.g. 1 millisecond (ms)) with high reliability (for example with 0.99999 success probability). URLLC payload may carry some very critical messages, for example related to industrial control, and Vehicle to Everything (V2X)/Vehicle to Vehicle (V2V) communication. The failure of these message can result in critical errors in system operation which can cause considerable damage and in extreme cases the malfunction can compromise human safety. URLLC may be one example of a communication schema which may be used when communicating with a terminal device or devices having such critical functions. However, other cellular solutions may be used. For simplicity reasons, the examples described hereinafter may utilize the URLLC. It is noted, however, that other similar cellular technologies may alternatively or additionally be applied.

Despite all the efforts in radio network to achieve the ambitious URLLC targets, sometimes it is impossible to reach the demanding reliability target, for example due to too deep coverage hole, without careful planning network which can result in expensive cost. Also, the environment (e.g. the coverage area of the communication system of FIG. 1A) can be under constant change and variation, making fully guaranteed coverage very difficult to arrange. There can be areas in the coverage area, where the signal level is simply too low for URLLC to work, despite all the gain owing to the applied mechanisms. For example, in mmWave communication, losing the Line Of Sight (LOS) can cause signal level to drop very fast 20-40 dB or even more which might be impossible to recover with regular communication means. In addition to bad coverage, problem can be also high, uncontrolled interference. Hence, there may be a certain area or areas within the coverage area of the communication network, in which the needed service cannot be provided to one or more terminal devices. This kind of environments or areas may exist, for example, in industrial areas, both outdoors and indoors. One example may be an industrial area (e.g. harbor area) where the autonomous or remotely controlled vehicles (straddle carriers, trucks, fork lifts, reach stackers) need very reliable wireless connectivity. If the connectivity is lost (e.g. industrial Ethernet heartbeat messages are lost for a few tens of milliseconds) it may not only cause a temporary halt in operation but also mechanical damage (for example due to collision but an emergency stop of a massive vehicle alone can cause damage). Such may happen if the possible area or areas in which the service cannot be provide exists or at least there is a risk of such area(s) existing within the coverage area. Due to dynamic nature of certain areas (e.g. moving objects, such as other vehicles, machinery and containers), these coverage hole areas may not necessarily be predicted or prevented. Hence, there seems to be a need to provide solutions which enhance the operation of the communication network in case there is a possibility of service failure within certain area or areas. The solution may be especially suitable for reducing service failures of critical services, such as vehicle (e.g. industrial vehicle) control or assisted vehicle control.

Referring to FIG. 1B, a possible problem situation may be shown. Problem may refer to the possible area(s) in which a requested or needed service may not be available to the terminal device 110 (sometimes referred to as User Equipment (UE)). That is, a vehicle 190 (e.g. industrial vehicle such as a truck, forklift and the like) may be associated with the terminal device 110. For example, the terminal device 110 may comprised in the vehicle 190. In some examples, the vehicle 190 may be the terminal device 110 or at least comprise its functions. The network element 102 may provide a cellular service to the terminal device 110 and/or to the vehicle 190 via the communication link 110-1. In some examples, the communication link utilizes the URLLC communication. The terminal device 110 may move according to the arrow 192. The arrow 192 may depict, for example, planned route of the vehicle 190, and thus in this example the route of the terminal device 110. In the coverage area of the cellular network, there may be a blocking object 180 causing possible coverage hole or shadow area 182. This may mean that the communication link 110-1 may not be necessarily available in the area 182, or at least the service may not be available within said area 182 using the communication link 110-1. Hence, the cellular network may determine that an action is needed to be performed as the terminal device 110 is moving to or going to move to said area 182. The action may be needed to enable the service to be provided to the terminal device. The network element 102 may be one entity of the cellular network. However, as described in relation to FIG. 1A, there may be a plurality of different elements in the cellular network. Therefore, the actions of the cellular network may be performed by the network element 102 and/or by some other element(s) of the said network. Accordingly, there is provided a solution to reduce service failures in the cellular network.

Figure 2:
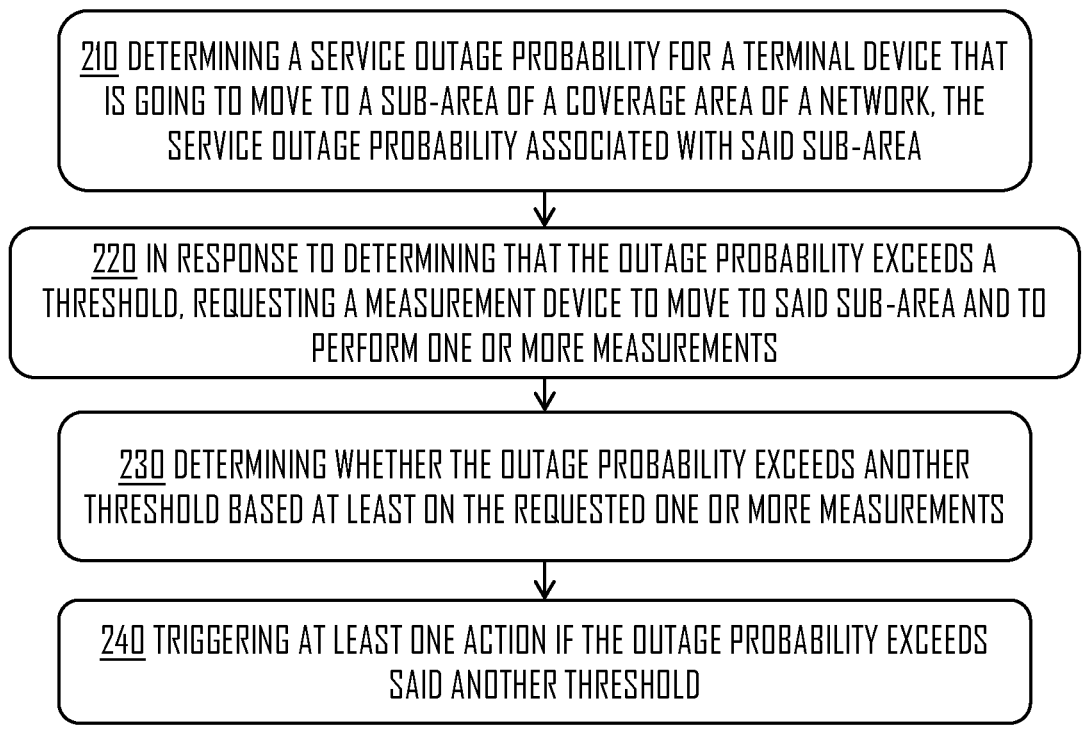
FIGS. 2 and 3 illustrate some embodiments.
Figure 3:
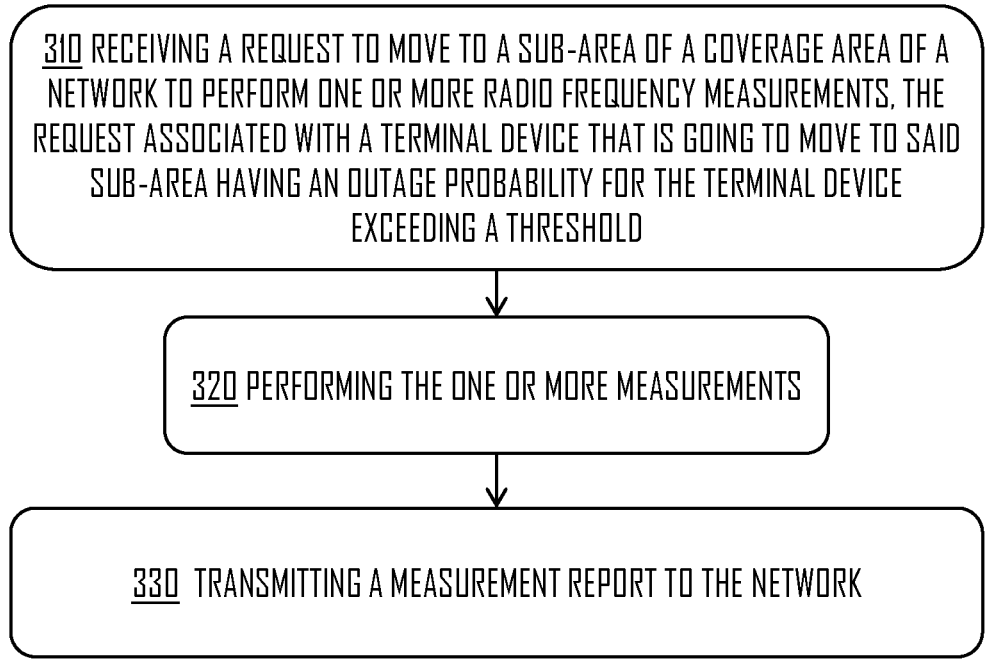

FIGS. 2 and 3 illustrate block diagrams according to some embodiments. Referring to FIG. 2, there is provided a method in a radio communication network providing a service for a plurality of devices, the method comprising: determining a service outage probability for a device that is going to move to a sub-area of a coverage area of the network, the service outage probability associated with said sub-area (block 210); in response to determining that the outage probability exceeds a threshold, requesting a measurement device to move to said sub-area and to perform one or more measurements (block 220); determining whether the outage probability exceeds another threshold based at least on the requested one or more measurements (block 230); and triggering at least one action if the outage probability exceeds said another threshold (block 240). Said one or more measurements may refer to one or more radio frequency measurements.

Referring to FIG. 3, there is provided a method in a movable measurement device providing a measurement service for a radio communication network providing a service to a plurality of devices, the method comprising: receiving a request to move to a sub-area of a coverage area of the network to perform one or more radio frequency measurements, the request associated with a device that is going to move to said sub-area having an outage probability for the device exceeding a threshold (block 310); performing the one or more measurements (e.g. radio frequency measurements) (block 320); and transmitting, based on the performed one or more radio frequency measurements, a measurement report to the network (block 330).

The device described in relation to FIGS. 2 and 3 may refer to the UE 110 and/or directly to the vehicle 190 in some cases. In case of vehicle 190, the device may mean one or more circuitries of the vehicle 190 which may be used to control, at least partially, the operation of the vehicle. Further, in such case the one or more circuitries may itself be or comprise the UE 110 or be in communication with the UE 110. Thus, the UE 110 may be used, in some cases, as a relay between the vehicle 190 and the network in order to provide the service to the vehicle 190.

Furthermore, the flow diagrams of FIGS. 2 and 3 describe a radio communication network which may refer to the networks described in relation to FIG. 1A, such as cellular network. The operations performed by the network in FIGS. 2 and 3 may be performed by one or more network elements of the said network. Hence, for example, network element 102 may perform such operations. Later it may be discussed how the operations of a network element may be shared between two or more physically separate entities (e.g. by utilizing network virtualization).

Even further, going to move may refer to situation where the device is already moving to said area and/or to situation where the device has not yet started moving to said area, but is planning to initiate moving towards and/or to said area.

According to an embodiment, a network element performing the steps of FIG. 2 may be, for example, the network element 102. Similar element or elements may perform operations of the network explained with respect to FIG. 3. The terminal device of FIGS. 2 and 3 may be one of the terminal devices 110, 120, 130, 140, for example. I.e. it may be associated and/or comprised in the vehicle 190, such as industrial vehicle. The movable measurement device may be explained below in more detail. One example of a movable measurement device is shown in FIG. 1B with reference sign 170 and its movement to the area 182 may be illustrated with an arrow 172. In an embodiment, the methods illustrated in FIGS. 2 and/or 3 may be performed within a predefined area, such as a harbor area. For simplicity reasons, the examples and embodiments described hereinafter use UE 110 or similar UEs as examples. However, as described above, the device (e.g. sometimes referred to as a vehicle device) for which the service is provided by the network may actually be or comprise something else than a simple UE. However, the operations of a UE in such network may be used to provide the service via the air-interface. Similarly, cellular network is used as an example although the described solutions may be applicable to other types of wireless network(s) (i.e. radio communication network(s)).

So, in general, it is proposed to have the measurement device 170 (e.g. a scouting device, such as a drone) to test the quality of connectivity in the location or locations where the UE 110 is soon going to be in order to prevent quality of connectivity to fall below a needed threshold, for example, due to bad channel condition or strong interference. This may be necessary, for example, for UEs which need to be connected to the cellular network continuously. For example, such may be necessary for assisted driving, remote controlled vehicles, or robot vehicles that may operate without a human controlling the vehicle.

In an embodiment, the system comprises a Central Control Unit (CCU) 10 configured to be communicatively coupled with the cellular network (e.g. via link 10-2) and control operation of one or more measurement devices 170. Hence, it may also be configured to be communicatively coupled with the measurement device(s) 170. However, as position of the device(s) 170 changes, the link with the CCU 10 may at least occasionally break. The device(s) 170 may thus be configured to perform measurements independently.

Figure 4:
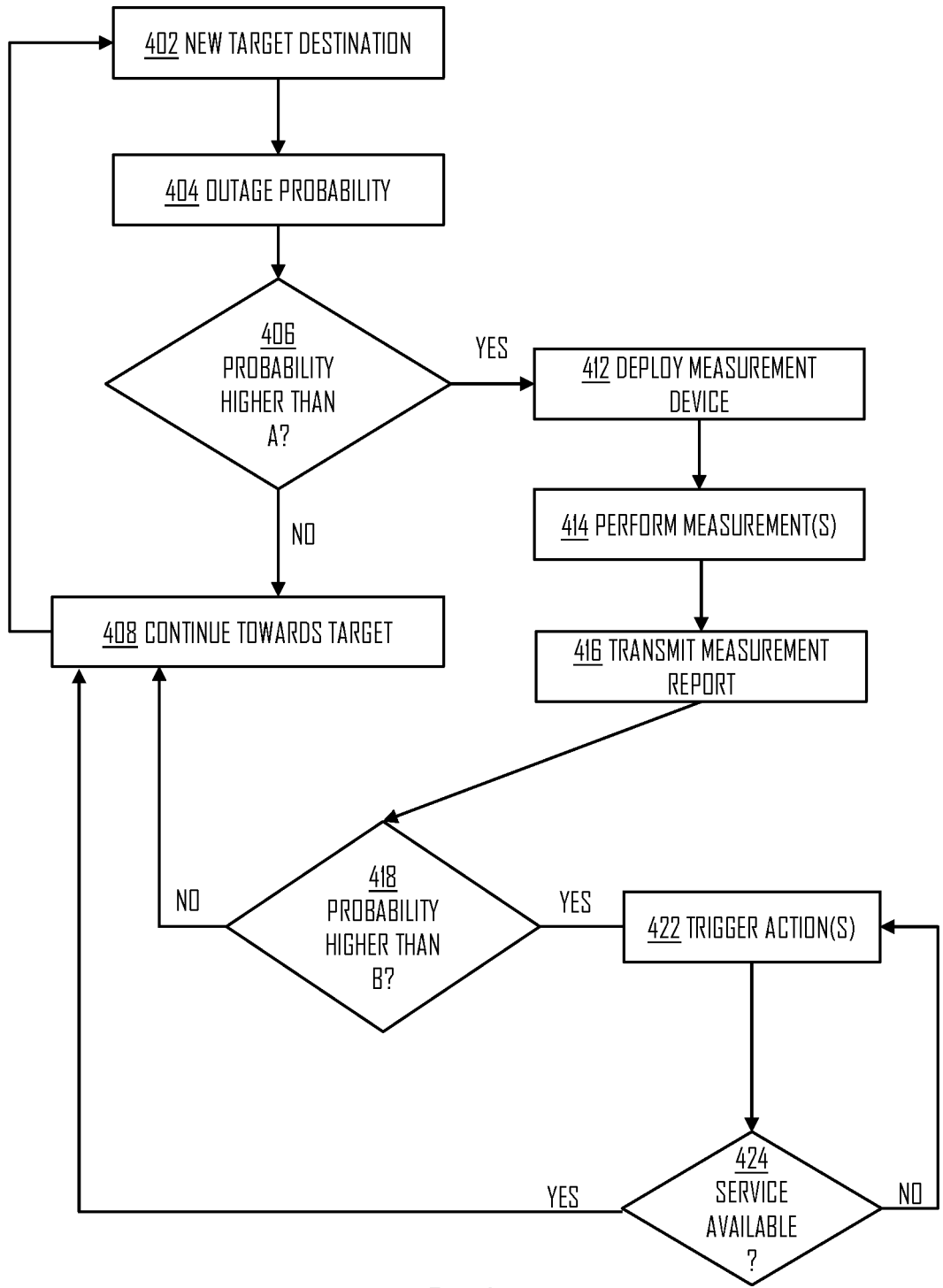
FIG. 4 illustrate an embodiment.

FIG. 4 illustrates a flow diagram according to some embodiments. Referring to FIG. 4, in step 404, the network element 102 may determine the service outage probability associated with the UE 110 and with certain area (e.g. area 182). For example, the target destination (block 402) may be such that the UE 110 is going to move (or needs to move) via said area 182. Said area 182 may be a sub-area of the coverage area of the cellular network, as was already discussed. Service outage may mean a situation in which the provided service cannot be provided to the UE 110 by the cellular network. It may not necessarily mean that the communication link between the UE 110 and the cellular network has been terminated or does not exist. However, even if there is the communication link, said communication link may not be sufficient for providing the needed service (e.g. remote controlling of the vehicle or automated operation of the vehicle with stringent QoS requirements). The service outage probability may provide an estimation what kind of probability there exists for such outage.

In step 406, the network element 102 may determine whether the service outage probability exceeds a first threshold. For example, the network element 102 may determine whether said probability is equal or higher than the first threshold. Different kinds of comparing may be performed, but the network element 102 may essentially determine whether the risk of service outage is higher than an accepted risk. The service outage probability threshold (e.g. first threshold) may be service specific. That is, the accepted risk for different services may also be different. For example, for fully automated vehicle service (i.e. automatic operation) the probability threshold may be lower compared with an assistance service.

In step 406, the network element 102 may utilize a number of different parameters in determining the probability. For example, the determination of the probability may be based on Signal to Interference Ratio (SIR), load in the network, UE speed, Signal-to-interference-plus-noise ratio (SINR), UE 110 radio frequency (RF) capability and configuration, BS 102 radio frequency (RF) capability and configuration, amount of time passed since last measurement of said area 182 or on planned route, amount of changes in blocking object configurations and/or number of blocking objects or elements. Blocking objects may be movable, and thus may change the RF environment. SIR and/or SINR may be obtained from a plurality of UEs in the coverage area and/or in the area 182, for example. However, it may also be based on general SIR or SINR measurement performed by the network element 102. The service outage probability determination or analysis may also be based on machine learning. In such case, learning data sets may be collected, by the cellular network, first based on simulations and later during the operation of the system based on running the system in the particular location in real life. Corresponding learning could also be done based on operating the system in other locations. As input to the machine learning one could use all directly related and indirectly related parameters available. Based on learning and operation, threshold could be set for the service outage risk or probability.

Some additional or alternative triggers which cause the deployment of the measurement device 170 (e.g. block 412) may include deploying the measurement device 170 in case:

The UE 110 has a planned route over the area which is known to have higher than usual probability for high interference and/or bad coverage;

The UE 110 will perform extreme mission-critical operation where losing the connection would mean extreme cost;

Unplanned blockers on the area, e.g. heavy equipment, big cranes, lorries etc. have move to the area and possibly changed the radio conditions;

High radio load in the network, which can cause higher interference than normally;

Higher than normal external interference (coming outside from the operation area); and/or Higher mobility than normally.

Based on one or more of the described parameters and triggers, the network may in block 406 determine whether the risk is so high that the measurement device 170 should be requested to perform measurements.

If the determined probability does not exceed the first threshold (e.g. is below the first threshold), the process may continue to step 408. If however, the probability exceeds the first threshold, the process may continue to step 412.

In step 408, the UE 110 may continue towards its target location. Once the target location has been reached, a new target destination may be obtained (block 402), for example. The network element 102 may indicate (in block 408) to the UE 110, at least in some embodiments, that there is no need to deploy the measurement device (block 412). However, this may not be necessary in all cases, as, for example, the UE 110 may not be aware about the determination in block 406. Hence, there may be no action needed.

In block 412, the network element 102 may deploy the measurement device 170 to perform one or more measurements. This may mean that the measurement device 170 is caused (e.g. via signaling) to move to the area 182 or at least close or closer to the area 182. However, in some cases the measurement device 170 may already be in the area 182, and may thus start the measurement(s) of block 414 immediately.

In an embodiment, the measurement device 170 is configured to move ahead of the UE 110. For example, distance between the two may be x milliseconds or N meters, wherein x and N denote positive numbers. The distance between the UE 110 and the measurement device 170 may be based on UE 110 speed and route, vehicle's (to which the UE 110 is associated or comprised in) physical properties (e.g. how fast in can stop and turn), and/or estimated latency between noticing the problem (e.g. service outage probability is high) and providing the solution (e.g. triggered countermeasures).

The measurement device 170 may be a land vehicle or an unmanned aerial vehicle (UAV), for example. In an embodiment, the vehicle 190 is a land vehicle, and thus the UE 110 may also move on the surface of the Earth. In some examples, the measurement device 170 may be similar to an UE. However, it may be configured to perform measurements on-demand by the cellular network.

In block 414, the measurement device 170 may perform the one or more measurements in the area 182. Said measurements may include SIR and/or SINR measurement, for example. In general, the measurements may be radio frequency measurements to determine whether the service can be provided to the UE 110 in the area 180 by the cellular network.

In block 416, the measurement device 170 may transmit a measurement report to the cellular network (e.g. to the network element 102). The measurement report may comprise the results of the performed measurements (block 414) and/or an indication whether the service is available in the area 182. Hence, the measurement device 170 may in some cases determine whether the service is available in the area 180, and indicate this to the cellular network.

The process may then continue to step 418. The process may continue to step 418 once the measurement report or reports (e.g. in case more than one measurement device 170 is deployed) are available. So, basically the cellular network may deploy more than one measurement devices 170 to the same area or to different areas. For example, such may enable the measurements to be performed on a larger area with less delay.

In an embodiment, the process continues to step 418 even if there is no report received from the measurement device 170 or devices. For example, if the measurement device 170 is unable to transmit the measurement report, the cellular network may wait the report for a certain time period and then continue to step 418 if the report is received within said time period or if the report is not received within said time period.

In step 418, the cellular network (e.g. the network element 102) may determine whether the service outage probability exceeds a second threshold (e.g. the service outage probability equal or higher than B). If no reports are received from the measurement device 170 or devices, the determination in block 418 may be similar or equal to determination in block 406. Hence, in some cases the first and second thresholds are equal or at least substantially equal. The second threshold may be based on the estimate of actual failure probability of the service in question (e.g. URLLC), using measured data.

However, in an embodiment, the second threshold is lower than the first threshold. This may mean that action(s) of block 422 are triggered with lower service outage probability.

In an embodiment, the second threshold is higher than the first threshold. This may mean that the action(s) of block 422 are triggered with higher service outage probability.

The determination of block 418 may be based at least on the received measurement report in block 416. In an embodiment, the network element 102 after receiving the measurement report or in response to the receiving the measurement report, stores said measurement report or at least some data of the measurement report to a database. Hence, at least in some embodiments, the determination in block 418 may be based on one or more measurement reports received from one or more measurement devices 170.

As described, it is also possible that the measurement device 170 performs the determination of block 418, and indicates this result to the cellular network. Hence, the analysis can be done either locally in the measurement device, or in a separate unit in the network side. In both cases, the measurement data may eventually be sent also to the cellular network so that it is available for all other future decisions. Outcome of this analysis may be the decision (see block 422) to trigger actions, and the type of actions.

If said probability exceeds the second threshold in block 418, the process may continue to step 422. Otherwise, the process may continue to block 408. In block 422, the cellular network may trigger one or more actions. In block 424, the cellular network may determine whether the service is available to the UE 110. Availability may be based on estimation and may not necessarily be exact. If it is determined that the service is available, the process may continue to block 408. Otherwise, the cellular network may trigger further action(s) (i.e. block 422). The triggered action(s) may be describe later in more detail.

In an embodiment, the determination in block 424 may be similar or the same to determination of block 418 or block 406. That is, for example, if route of the UE 110 is changed, the cellular network may determine whether the service outage probability on said route or in some area of the route exceeds the first threshold and/or the second threshold.

Figure 5A:
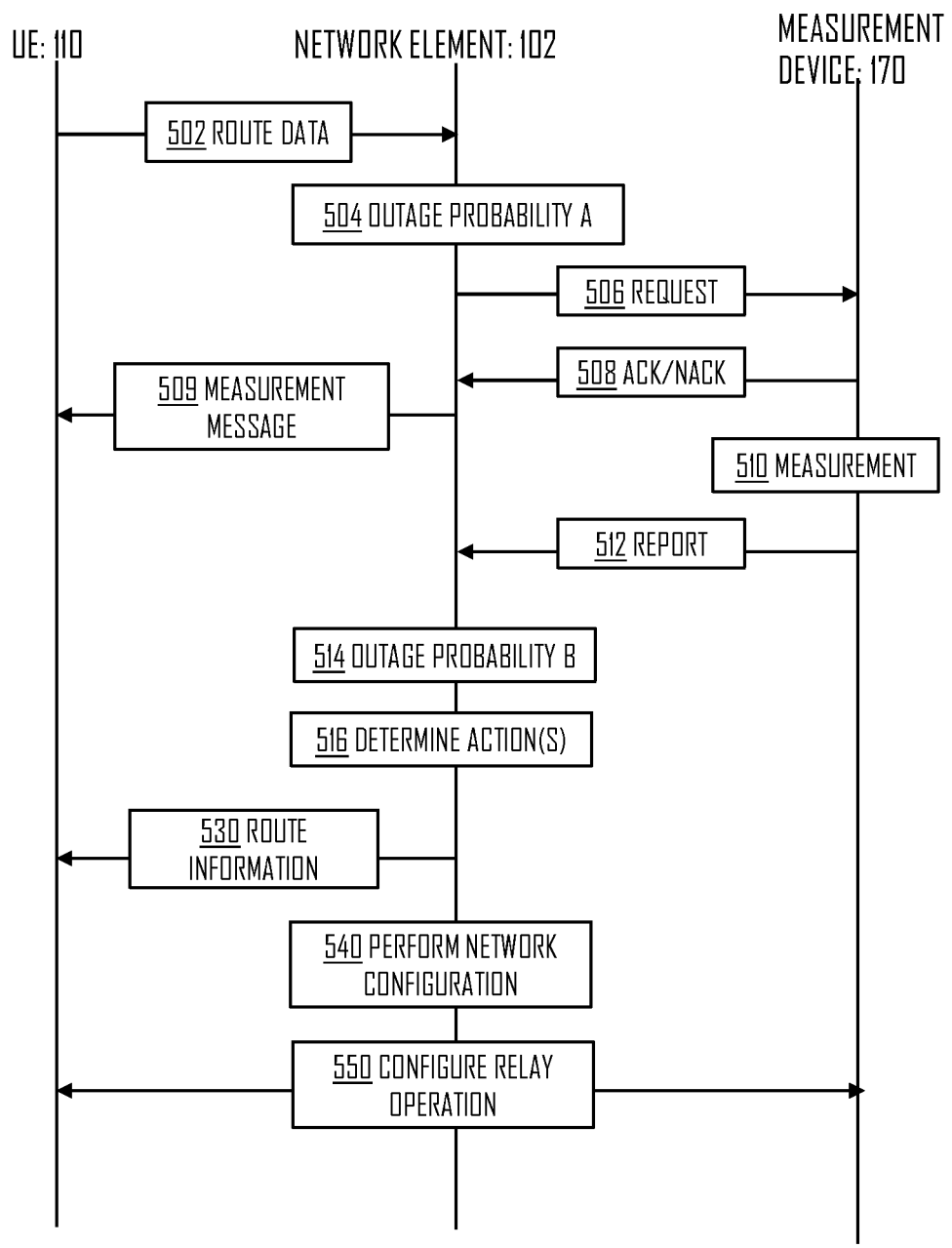
FIG. 5A illustrates a signal diagram in the cellular system according to an embodiment.

FIG. 5A illustrates a signal diagram in the cellular system according to an embodiment. Referring to FIG. 5A, in an embodiment, the cellular network (e.g. the network element 102) acquires route data indicating a planned route of the UE 110 (block 502). The cellular network may then determine, based on the route data, that the UE 110 is going to move to a sub-area associated with a certain service outage probability. The route data may indicate the target location of the UE 110, the current location of the UE 110 and/or the actual planned route. In an embodiment, the UE 110 comprises a satellite position circuitry, such as Global Positioning System (GPS), for determining location of the UE 110. This location may then be reported to the cellular network. In an embodiment, the UE 110 transmits the route data to the network element 102. This may happen, for example, after acquiring the target destination in block 402. Hence, the network element 102 may determine whether the route (determined e.g. based on actual indicated route, such as route points, or based on extrapolating the route between starting point and end point) crosses a certain area associated with the service outage risk, and then trigger measurement(s) on said area.

In block 504, the network element 102 may then determine the service outage probability as in blocks 404 and 406, and transmit a request for the measurement device 170 if the first threshold is exceeded (block 506 which may comprise similar or same actions as deployment in block 412). The request may be transmitted to the measurement device 170 or to a network element controlling a plurality of measurement devices 170. The request may be associated with a specific UE, i.e. in this case with UE 110. This may mean, for example, that the request, according to an embodiment, is a request message comprising identifier of the UE 110 and/or route data of the UE 110. The identifier may be a unique identifier, for example. The request message may additionally or alternatively comprise information about the area in which the measurements should be performed. Thus, for example, a target location or area may be indicated so that the measurement device 170 may be moved to correct location (e.g. area 182). In an embodiment, the request indicates what or which measurements are requested. For example, the request may indicate that SINR measurement on certain area is needed.

In block 508, a response message to the request may be received, wherein the response message indicates either acceptance (ACK) or non-acceptance (NACK) of the request. The response message may comprise identifier of the measurement device 170. The identifier may be a unique identifier, for example.

In block 510, as a response to the request in block 506, the measurement device 170 may perform the one or more measurements in the requested area (e.g. area 182). As described, said area may be a sub-area of the coverage area of the cellular network. The measurement(s) may be associated to the UE 110 specifically. This may mean that the measurement device 170 performs the measurements specifically to the UE 110 upon request from the network. Hence, said measurement(s) may be referred to as on-demand measurement(s).

In block 512, the measurement device 170 may transmit the measurement report to the network element 102 as described in block 416. The process may then continue as described already with respect to FIG. 4 in block 514. In block 514, the service outage probability may be determined. Further, in block 516, the network element 102 may determine action(s) to be performed/triggered based on comparing the service outage probability against the second threshold. Different determined and/or triggered actions are indicated with blocks 530, 540, and 550 respectively.

In an embodiment, in block 509, the network element 102 transmits a message to the UE 110 after and/or in response to receiving the response message from the measurement device 170 in block 508. Said message to the UE 110 may indicate that the measurement(s) will be performed or will not be performed. Said message to the UE 110 may indicate the measurement device identifier in the case that the message in block 508 is ACK.

In an embodiment, the network element 102 acquires measurement data from the measurement device 170 (block 512), wherein the determining whether the outage probability exceeds said another threshold (block 514) is based at least on the acquired measurement data. As described, additionally or alternatively measurement data from a database may be used in the determination.

In an embodiment, if the service outage probability does not exceed the second threshold (block 418), the route information (block 530) may indicate that the UE 110 should continue on the planned route.

Figure 5B:
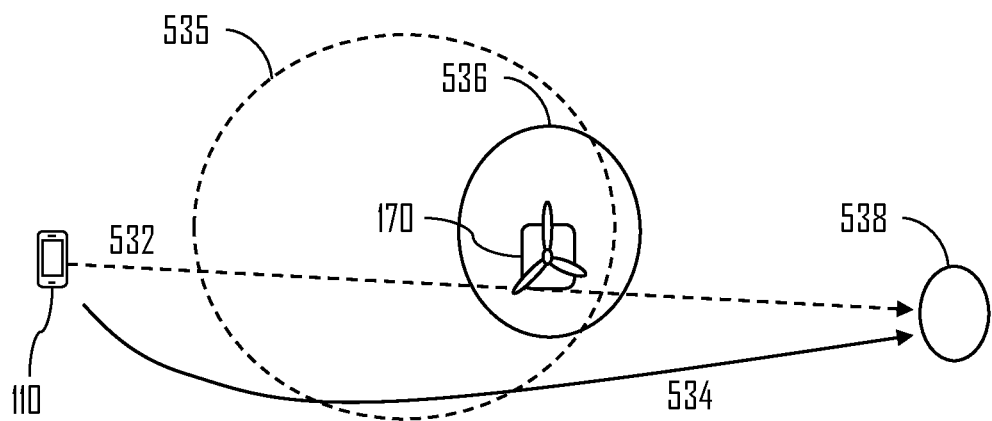
FIGS. 5B to 5C illustrate some embodiments.

In an embodiment, if the service outage probability exceeds the second threshold (block 418), the route information (block 530) may indicate an updated or changed route. I.e. the route information may be transmitted to cause the UE 110 to change route to prevent the UE 110 from moving to the area associated with the service outage risk (e.g. area 182). One specific example of this may be shown in an embodiment of FIG. 5B. Referring to FIG. 5B, a planned route 532 of the UE 110 may be shown. However, the planned route 532 may go through an area 536 (i.e. sub-area of the coverage area of the cellular network). The measurement device 170 may perform measurements on said area 536 as describe above. In this example, the risk is determined to be of such level, that the network element 102 triggers a route change. Hence, a new route 534 may be indicated to the UE 110 by the network element 102 (e.g. in block 530). Said new route 534 may be planned such that it does not enter the area 536. Both the planned route 532 and the new route 534 may reach a target location 538 of the UE 110.

It also needs to be noted that the area to which the measurement device 170 has been deployed to perform measurements may be dynamically changed. That is, it may well be that the network element 102 determines an area 535 associated with a service outage risk exceeding the first threshold. The measurement device 170 may be sent to said area 535 to perform measurements. Said area 535 may comprise the planned route or be essentially the planned route 532. As described above, the measurement device 170 may in some cases be configured to move ahead of the UE 110 at a certain distance and perform the measurements. In some cases this may mean that the measurement device 170 performs the measurement on the whole planned route (or what is still not travelled of said planned route).

Based on the measurements, the service outage probability may be further determined (e.g. in block 514). The network element 102 may determine that the service outage probability exceeds the second threshold in the area 536. Hence, the area associated with the risk that causes the triggering of different action(s) may actually change during the process, for example, based on the measurement(s).

In an embodiment, the network element 102 indicates to the UE 110 that the service is unavailable within a certain area (e.g. area 536). This may be performed additionally or alternatively to triggering action(s) 530, 540, 550. In one example, the UE 110 may use the received information to determine that the route needs to be changed. Hence, the UE 110 may itself configure a new route. In another example, this information may provide information to the operator (e.g. remote operator) of the UE 110 (or more particularly the vehicle 190). Hence, the shadow area may be evaded, for example.

Figure 5C:
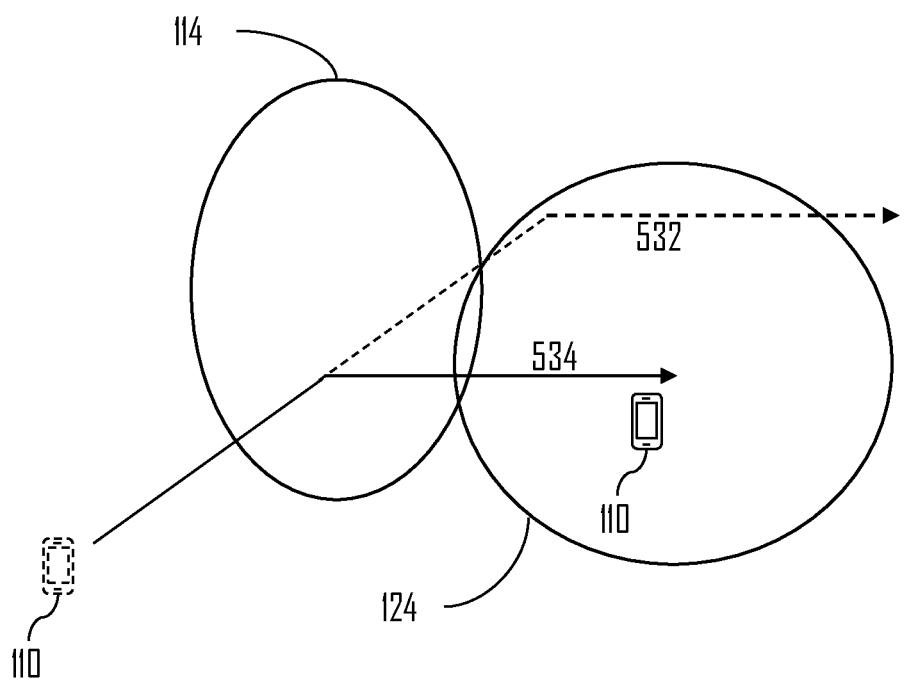

Another example of changing route is shown in FIG. 5C. Referring to FIG. 5C, the UE 110 may have a planned route 532 going through coverage area of cells 114 and 124. The measurement device 170 may be deployed as it may be determined that the coverage may be weak or potentially non-existing for the needed service on the route 532. On the basis of the measurements performed by the measurement device 170, the route may be changed to new route 534 to reduce the risk of losing connectivity (i.e. communication link between the cellular network and the UE 110).

Additionally or alternatively to actions in block 530 and/or other actions described above, the network element 102 may perform network configuration (block 540), if the service outage probability exceeds the second threshold (e.g. block 418). In an embodiment, the action(s) of block 540 comprise allocating, by the cellular network, further radio resources to the UE 110. That is, for example, more time domain resources and/or frequency domain resources may be allocated to the UE 110, so that the change of the service outage may be reduced as the UE 110 may have further opportunities to transfer the needed data. The allocation may comprise allocating one or both uplink and downlink radio resources, as is known in the art.

Figure 5D:
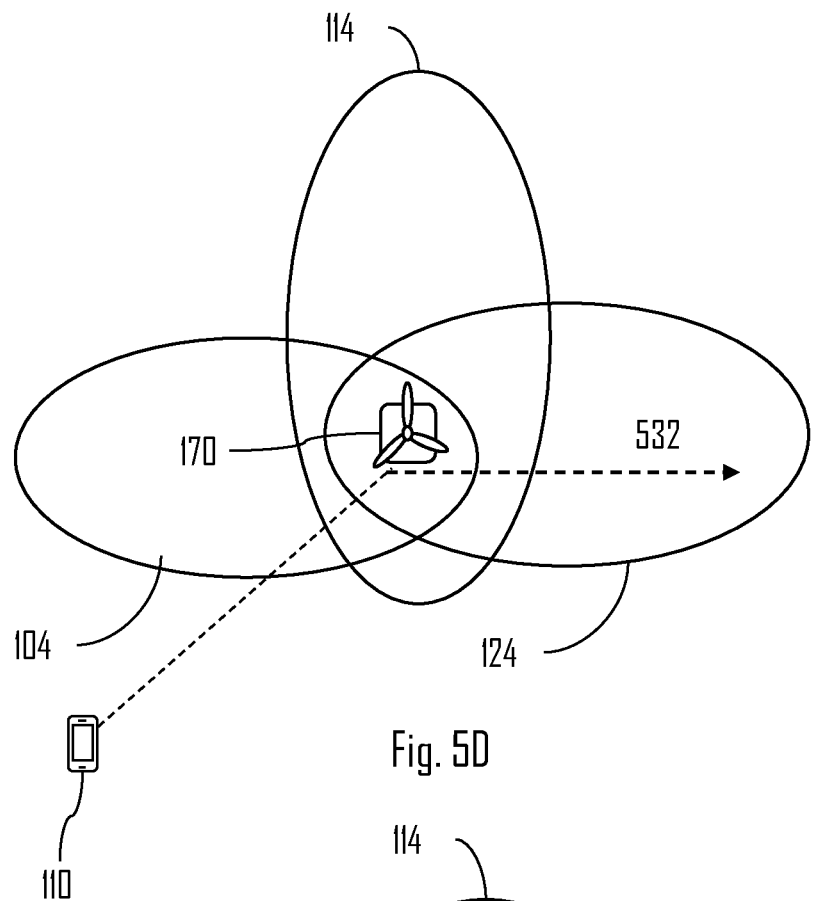
FIGS. 5D to 5F illustrate a sequences of a process according to an embodiment.
Figure 5E:
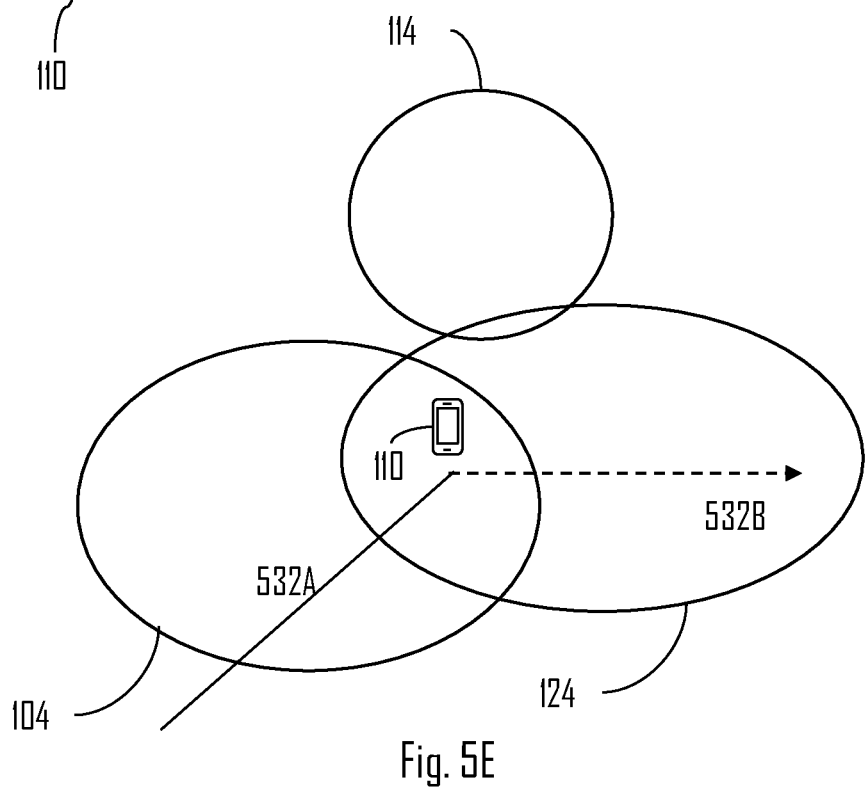
Figure 5F:
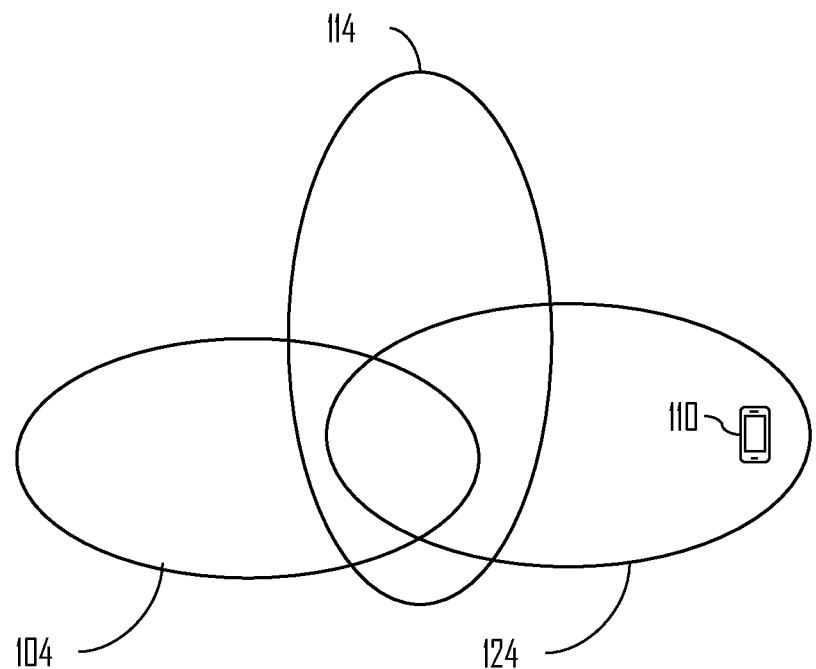

In an embodiment, the action(s) of block 540 comprise adjusting transmit power of at least one cell (e.g. cell(s) 104, 114, 124). One example of this may be shown in sequence illustrated in FIGS. 5D to 5E. That is, in FIG. 5D, the UE 110 has a planned route 532 that goes through each of cells 104, 114, 124. The network element 102 may determine that one or more of cells 104, 114, 124 may cause interference (i.e. service outage risk) and may thus deploy the measurement device 170. Based on the measurements, the transmit power (i.e. controls coverage area of a cell) of at least one of said cells may be changed by the cellular network (e.g. the network element 102). In FIG. 5E, such adjustment may be shown. As an example, transmit power of cell 114 may be reduced and transmit power of cells 104 and/or cell 124 may be increased. Hence, the service may be provided to the whole route including the travelled route 532A and rest of the planned route 532B. In this specific example, the interference source may the cell 114. Furthermore, in an embodiment, the sequence of FIGS. 5D and 5E may continue in FIG. 5F, wherein the transmit powers of the cells 104, 114, 124 may be restored, by the network, to the situation of FIG. 5D once the UE 110 has left the area associated with the service outage risk. This may enhance the network's ability to provide service to other devices, for example.

In an embodiment, at least one cell causing interference within an area is identified, and the transmit power of said at least one cell reduced and/or further radio resources are allocated to the UE 110. For example, the measurement data may indicate the source of interference as different cells may be identified via cell identifiers (e.g. unique identifiers). Hence, the network element 102 may adjust the transmit powers accordingly. In an embodiment, the network element 102 determines that the UE 110 has exited said area; and in response to the determining, restores the adjusted transmit power of the at least one cell (e.g. see FIG. 5F). According to a specific example, when the measurement device 170 enters the problem area, it may identify the main interference source for example cell 114 and then such information may be report to the cellular network. Then cellular network may then perform certain actions, for example, adjusting resource allocation for URLLC UE 110 or adjusting transmit power of cells in order to have a clean channel for URLLC UE 110 once it enters the problematic area. In the example of FIG. 5E, it is shown that the coverage of cell 114 is reduced in order to bring down the interference level and at the same time, the coverage area for both cell 104 and cell 124 are enlarged to achieve the reliable handover/mobility performance of URLLC UE 110 (e.g. handover from cell 104 to cell 124). Multi-connectivity can be applied here as well. And when URLLC UE110 moves out of the problematic area, all the cells may restore their configuration.

In an embodiment, the cellular network supports multi-connectivity. The UE 110 may also support such connectivity. This may further reduce the probability of service outage for the UE 110 in the coverage area of the cellular network.

Figure 6A:
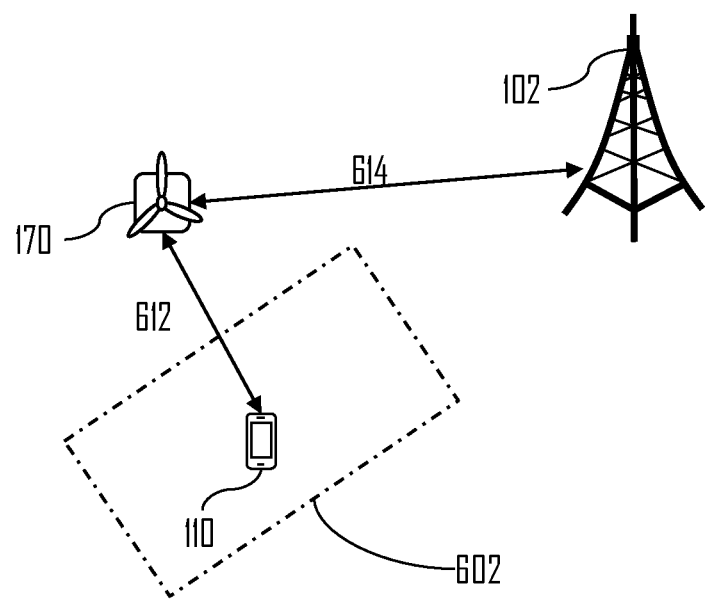
FIGS. 6A to 6B illustrate some embodiments.
Figure 6B:
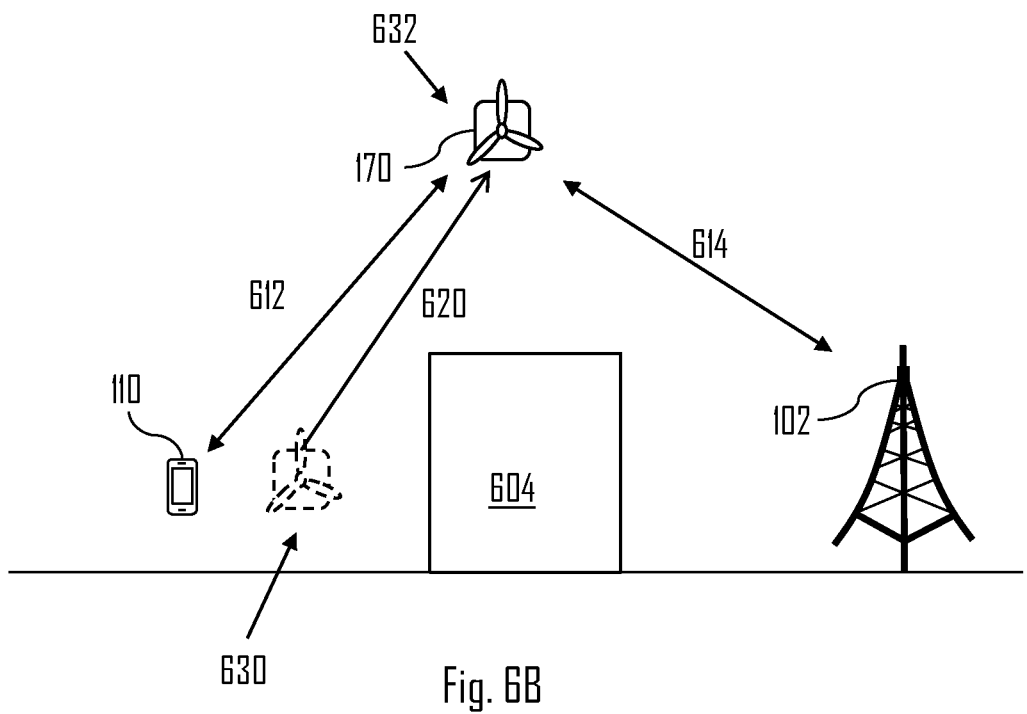

Additionally or alternatively to actions in block 530, block 540, and/or other actions described above, the network element 102 may configure the measurement device 170 to act as a relay to provide the needed service to the UE 110 (block 550). The relay function may be triggered, for example, if the service outage probability exceeds the second threshold (block 418). The relay operation may be shown in embodiments of FIGS. 6A to 6B.

In general, acting as a relay may mean that the measurement device 170 is used to forward messages between the network (e.g. network element 102) and the UE 110. Hence, for example, in FIGS. 6A and 6B, the measurement device 170 may be communicatively coupled with both the network element 102 (arrow 614) and the UE 110 (arrow 612). Hence, although the UE 110 would be within an area 602 (e.g. a coverage hole or shadow area), the messages between the UE 110 and the network element 102 may be transferred using the links 612, 614 via the measurement device 170. It needs to be noted that the link 612 may be suitable for providing the service although the UE 110 would be within the area 602. This may be because the device-to-device (D2D) link 612 may not necessarily be associated with the coverage hole. I.e. the coverage hole may be associated with a direct communication link between the UE 110 and the network 102.

In an embodiment, the measurement device 170 may receive a request to act as the relay to enable the cellular service between the terminal device 110 and the cellular network and forward messages between the terminal device and the cellular network (e.g. links 612, 614).

In an embodiment, the measurement device 170 may determine that a communication link between the measurement device 170 and the terminal device 110 (e.g. link 612) and/or between the measurement device 170 and the cellular network (e.g. link 614) is deteriorating or is lost and in response to the determining, the measurement device 170 may move to a different location. Said different location may be such that the link(s) can be restored and/or enhances so that a needed communication quality and/or data rate is achieved. Example of this may be seen in FIG. 6B, wherein the measurement device 170 may first be at location 630 (e.g. performing measurements and/or acting as a relay) and move to location 632 as the relay operation may not be possible at location 630 due to the obstacle 604. For example, the measurement device 170 may first move to the location 630 to perform the measurements. It may be beneficial that this location is close to the actual location of the UE 110 so that the measurement is as accurate as possible. However, the measurement device 170 may occasionally move to other location(s) 632 so that the communication with the network may be possible in case it is not at location 630. In one example, the measurement device 170 moves to location 632 so that both links 612, 614 are possible to maintain. As described, in some cases the measurement device 170 is an UAV or is comprised in an UAV. This may enable horizontal and vertical movement, and thus 3D location changes.

As discussed, in some cases the signal or communication link 614 may be so weak (or is under so high interference) that the measurement device 170 is unable to communicate with the network. It needs to be noted that the link 614 may additionally or alternatively be used to transfer measurement report(s) to the network (e.g. block 416). In such case, the measurement device can quickly change its position (even upwards) to get the signal back and exchange the needed messages with the network. It is noted that the signal might be good enough for normal communication even if it is not enough for URLLC. Hence, for example, the measurement report(s) may be transmitted although the service is unavailable even with the relay operation. Losing the communication link 614 can itself be a trigger for action (e.g. actions of block 530, 540, 550), even without explicit signaling. The measurement device may also, for example, maintain a separate heartbeat signaling link to the network. If heartbeat messages are not any more received by the network that itself may be a sign of bad link (e.g. service outage probability may be determined to be high based on such determination). Such information may be utilized in the determination of block 418, for example.

Different possible actions of blocks 516 and/or 422 were discussed above. These may include the actions described with respect to blocks 530, 540, and/or 550, for example. Additionally or alternatively, the network element 102 may trigger the UE 110 to apply the most robust transmission method available, for example, with a low level of Modulation and Coding Scheme (MCS). In an embodiment, the network element 102 may trigger the UE 110 to apply lower MCS than currently used.

Additionally or alternatively, the network element 102 may trigger the UE 110 to apply repetition for the transmissions (i.e. transmission of used in providing the service to the UE 110). This may mean that retransmissions are sent in advance without waiting for negative acknowledgments from the network.

Additionally or alternatively, the network element 102 may cause switching the URLLC communications to a cleaner band (e.g. in case of interference) or to a more robust band (e.g. with lower center frequency, in case of coverage problem). Also, a separate short-term dedicated "rescue" band may be reserved quickly for this geographical area so that the UE 110 is able maintain the critical communication over that area. After passing the critical areal, rescue spectrum may be released. In general, the network element 102 may perform network configuration so that the service outage probability may be reduced of a certain area (e.g. area 182).

Additionally or alternatively, the network may apply macro-diversity/multi connectivity. That is, the network element 102 and some other network element(s) may transmit the same downlink data packet(s) to the UE 110. Similarly, the network element 102 and some other network element(s) may be configured to receive the same uplink data packet(s) from the UE 110. The network may jointly schedule radio resources for plurality of UEs, e.g. UEs which have service outage risk exceeding a threshold or thresholds. For example, joint scheduling can be used for increased signal power (e.g. Coordinated Multipoint operation (CoMP)) or reducing inter-cell interference by e.g. muting certain resource blocks to avoid bringing interferences to said plurality of UEs.

Figure 7:
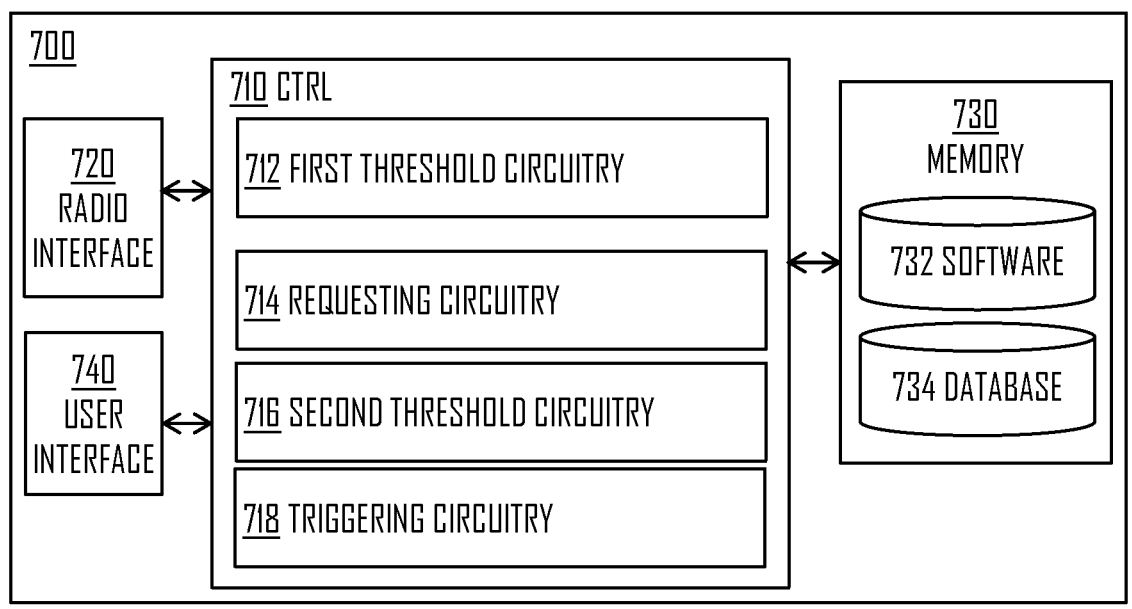
FIGS. 7 and 8 illustrate block diagrams according to some embodiments.
Figure 8:
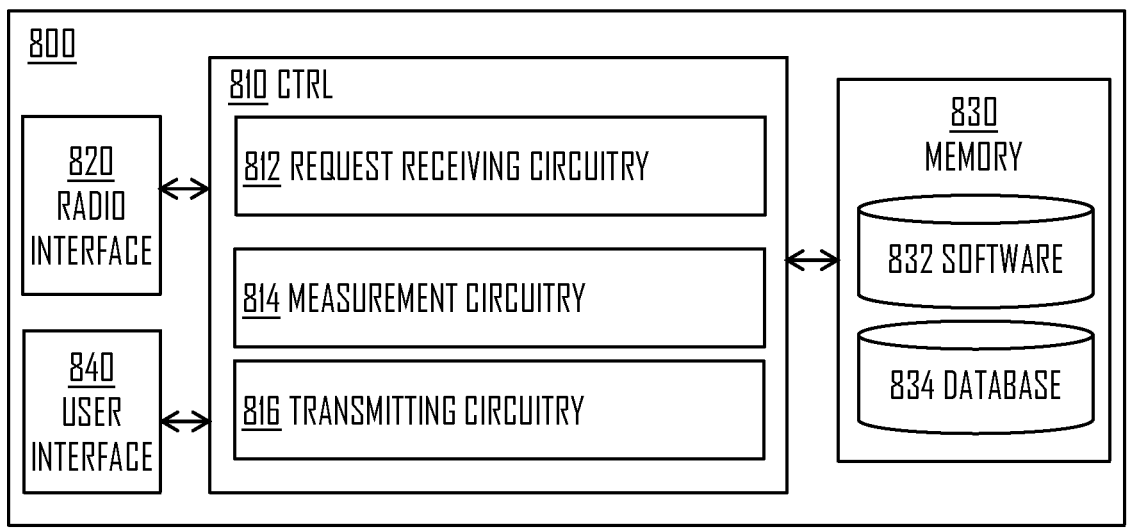

FIGS. 7 to 8 provide apparatuses 700, 800 comprising a control circuitry (CTRL) 710, 810, such as at least one processor, and at least one memory 730, 830 including a computer program code (software) 732, 832, wherein the at least one memory and the computer program code (software) 732, 832, are configured, with the at least one processor, to cause the respective apparatus 700, 800 to carry out any one of the embodiments of FIGS. 1A to 6B, or operations thereof.

Referring to FIGS. 7 to 8, the memory 730, 830, may be implemented using any suitable data storage technology, such as semiconductor based memory devices, flash memory, magnetic memory devices and systems, optical memory devices and systems, fixed memory and removable memory. The memory 730, 830 may comprise a database 734, 834 for storing data. For example, the database may be for storing the one or more measurement reports received from the one or more measurement devices 170.

The apparatuses 700, 800 may further comprise radio interface (TRX) 720, 820 comprising hardware and/or software for realizing communication connectivity according to one or more communication protocols. The TRX may provide the apparatus with communication capabilities to access the radio access network, for example. The TRX may comprise standard well-known components such as an amplifier, filter, frequency-converter, (de)modulator, and encoder/decoder circuitries and one or more antennas. For example, the TRX may enable communication between the terminal device 110 and the network element 102 and/or the D2D communication capability between the terminal device 110 and the measurement device 170. Further, the TRX may provide access to the X2-interface for the network element 102, for example.

The apparatuses 700, 800 may comprise user interface 740, 840 comprising, for example, at least one keypad, a microphone, a touch display, a display, a speaker, etc. The user interface 740, 840 may be used to control the respective apparatus by a user of the apparatus 700, 800.

In an embodiment, the apparatus 700 may be or be comprised in the network element 102, for example. The apparatus 700 may be or be comprised in the network element performing the steps of FIG. 2, for example.

Referring to FIG. 7, the control circuitry 710 may comprise a first threshold circuitry 712 configured to perform operations described in and/or with respect to block 210, a requesting circuitry 714 configured to perform operations described in and/or with respect to block 220, a second threshold circuitry 716 configured to perform operations described in and/or with respect to block 230, and a triggering circuitry 718 configured to perform operations described in and/or with respect to block 240.

In an embodiment, the apparatus 800 may be or be comprised in the measurement device 170. The apparatus 800 may be or be comprised in the device performing the steps of FIG. 3, for example.

Referring to FIG. 8, the control circuitry 810 comprises a request receiving circuitry 812 configured to perform operations described in and/or with respect to block 310, a measurement circuitry 814 configured to perform operations described in and/or with respect to block 320, and a transmitting circuitry 816 configured to perform operations described in and/or with respect to block 330.

In some embodiments of FIGS. 7 and 8, at least some of the functionalities of the apparatus 700 (e.g. network element 102) and/or the apparatus 800 may be shared between two physically separate devices, forming one operational entity. Therefore, the apparatus may be considered to depict the operational entity comprising one or more physically separate devices for executing at least some of the above-described processes. Thus, the apparatus of FIG. 7 utilizing such a shared architecture, may comprise a remote control unit (RCU), such as a host computer or a server computer, operatively coupled (e.g. via a wireless or wired network) to a remote radio head (RRH) located at a base station site. In an embodiment, at least some of the described processes of the network element 102. In an embodiment, the execution of at least some of the described processes may be shared among the RRH and the RCU. In such a context, the RCU may comprise the components illustrated in FIG. 7, and the radio interface 720 may provide the RCU with the connection to the RRH. The RRH may then comprise radio frequency signal processing circuitries and antennas, for example.

With respect to the apparatus of FIG. 7, in an embodiment, the RCU may generate a virtual network through which the RCU communicates with the RRH. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (i.e. to the RCU). External network virtualization is targeted to optimized network sharing. Another category is internal virtual networking which provides network-like functionality to the software containers on a single system.

In an embodiment, the virtual network may provide flexible distribution of operations between the RRH and the RCU. In practice, any digital signal processing task may be performed in either the RRH or the RCU and the boundary where the responsibility is shifted between the RRH and the RCU may be selected according to implementation.

With respect to FIG. 8, the functionalities of the measurement device 170 may be shared between a measurement entity configured to perform the measurements and between one or more entities configured to control the operation of the measurement entity (e.g. CCU 10 at a base site).

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 1A to 8 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 1A to 8 or operations thereof.

According to yet another embodiment, the apparatus carrying out the embodiments comprises a circuitry including at least one processor and at least one memory including computer program code. When activated, the circuitry causes the apparatus to perform at least some of the functionalities according to any one of the embodiments of FIGS. 1A to 8, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 1A to 8 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method in a radio communication network providing a service for a plurality of devices comprising:

determining a service outage probability for a device that is going to move to a sub-area of a coverage area of the network, the service outage probability associated with said sub-area;

in response to determining that the service outage probability exceeds a threshold, requesting a measurement device to move to said sub-area and to perform one or more radio frequency measurements;

determining whether the service outage probability exceeds another threshold based at least on the requested one or more radio frequency measurements; and triggering at least one action if the service outage probability exceeds said another threshold.

2. The method of claim 1, further comprising:
acquiring the measurement data from the measurement device, wherein the determining whether the service outage probability exceeds said another threshold is based at least on the acquired measurement data.

3. The method of claim 1, wherein the triggering the at least one action comprises causing said device to change route to prevent the said device from moving to said sub-area.

4. The method of claim 1, wherein the triggering the at least one action comprises indicating to said device that the service is unavailable within a certain area.

5. The method of claim 1, wherein the triggering the at least one action comprises requesting the measurement device to act as a relay to provide the service to said device.

6. The method of claim 1, wherein the triggering the at least one action comprises allocating further radio resources to said device.

7. The method of claim 1, wherein the triggering the at least one action comprises adjusting transmit power of at least one cell.

8. The method of claim 1, wherein the measurement device is comprised in a movable vehicle.

9. The method of claim 1, further comprising:
acquiring route data indicating the planned route of said device; and
determining based on the route data that said device is going to move to said sub-area.

10. An apparatus comprising:
at least one processor, and
at least one memory comprising a computer program code, wherein the at least one memory and the computer program code are configured, with the at least one processor, to cause the apparatus to perform operations comprising:
determining a service outage probability for a device that is going to move to a sub-area of a coverage area of a radio communication network, the service outage probability associated with said sub-area;
in response to determining that the service outage probability exceeds a threshold, requesting a measurement device to move to said sub-area and to perform one or more radio frequency measurements;
determining whether the service outage probability exceeds another threshold based at least on the requested one or more radio frequency measurements; and
triggering at least one action if the service outage probability exceeds said another threshold.

11. The apparatus of claim 10, wherein the at least one memory and the computer program code are configured, with the at least one processor, to cause the apparatus further to perform operations comprising:
acquiring the measurement data from the measurement device, wherein the determining whether the service outage probability exceeds said another threshold is based at least on the acquired measurement data.

12. The apparatus of claim 10, wherein the triggering the at least one action comprises causing said device to change route to prevent the said device from moving to said sub-area.

13. The apparatus of claim 10, wherein the triggering the at least one action comprises indicating to said device that the service is unavailable within a certain area.

14. The apparatus of claim 10, wherein the triggering the at least one action comprises requesting the measurement device to act as a relay to provide the service to said device.

15. The apparatus of claim 10, wherein the triggering the at least one action comprises allocating further radio resources to said device.

16. The apparatus of claim 10, wherein the triggering the at least one action comprises adjusting transmit power of at least one cell.

17. The apparatus of claim 10, wherein the measurement device is comprised in an unmanned aerial vehicle.

18. The apparatus of claim 10, wherein the at least one memory and the computer program code are configured, with the at least one processor, to cause the apparatus further to perform operations comprising:
acquiring route data indicating the planned route of said device; and
determining based on the route data that said device is going to move to said sub-area.

19. An apparatus comprising:
at least one processor, and
at least one memory comprising a computer program code, wherein the at least one memory and the computer program code are configured, with the at least one processor, to cause the apparatus to perform operations comprising:
receiving a request to move to a sub-area of a coverage area of a radio communication network to perform one or more radio frequency measurements, the request associated with a device that is going to move to said sub-area having a service outage probability for said device exceeding a threshold;
performing the one or more radio frequency measurements; and
transmitting, based on the performed one or more radio frequency measurements, a measurement report to the network.

20. The apparatus of claim 19, wherein the at least one memory and the computer program code are configured, with the at least one processor, to cause the apparatus further to perform operations comprising:
receiving a request to act as a relay to enable the service between said device and the network; and
forwarding messages between said device and the network.

21. The apparatus of claim 19, wherein the at least one memory and the computer program code are configured, with the at least one processor, to cause the apparatus further to perform operations comprising:
determining that a communication link between the measurement device and said device and/or between the measurement device and the network is deteriorating or is lost;

in response to the determining, moving to a different location.

* * * * *